(12) United States Patent
Frosini

(10) Patent No.: US 6,835,044 B2
(45) Date of Patent: Dec. 28, 2004

(54) DRAINING AND COOLING SYSTEM FOR GAS TURBINE CUSHIONS

(75) Inventor: Franco Frosini, Florence (IT)

(73) Assignee: Nuovo Pignone Holding S.p.A., Florence (IT)

( * ) Notice: Subject to any disclaimer, the term of this patent is extended or adjusted under 35 U.S.C. 154(b) by 76 days.

(21) Appl. No.: 10/312,915

(22) PCT Filed: Jun. 29, 2001

(86) PCT No.: PCT/EP01/07444
§ 371 (c)(1),
(2), (4) Date: Jan. 3, 2003

(87) PCT Pub. No.: WO02/02912
PCT Pub. Date: Jan. 10, 2002

(65) Prior Publication Data
US 2003/0138319 A1 Jul. 24, 2003

(30) Foreign Application Priority Data
Jul. 3, 2000 (IT) .................................... MI2000A1494

(51) Int. Cl.$^7$ ............................................. F01D 25/18
(52) U.S. Cl. ..................................... 415/111; 415/229
(58) Field of Search ......................... 415/110–112, 142, 415/175, 229

(56) References Cited

U.S. PATENT DOCUMENTS

| 4,465,427 A | * | 8/1984 | Libertini et al. ............ 415/112 |
| 5,494,355 A | | 2/1996 | Haase |
| 5,746,574 A | * | 5/1998 | Czachor et al. ............. 415/142 |
| 5,954,434 A | | 9/1999 | Oeynhausen |

FOREIGN PATENT DOCUMENTS

| DE | 1238723 | 4/1967 |
| DE | 196 06 088 A1 | 8/1997 |

* cited by examiner

Primary Examiner—Edward K. Look
Assistant Examiner—Richard A Edgar
(74) Attorney, Agent, or Firm—Nixon & Vanderhye

(57) ABSTRACT

A draining and cooling system for gas turbine cushions where the above-mentioned gas turbine has its own drain unit (11), which consists of two essentially concentric rings connected to each other by means of a number of spokes (12, 13). In the draining system described, the lubricating and cooling oil is fed into the gas turbine's drain unit (11) by means of at least a first pipe (14), located inside one of the spokes (12) and is drained by means of at least a second pipe (20), located inside one of the spokes (13).

6 Claims, 2 Drawing Sheets

DRAINING AND COOLING SYSTEM FOR GAS TURBINE CUSHIONS

The subject of this invention is a draining and cooling system for gas turbine cushions.

As is known, gas turbines have a compressor, to which outside air is supplied to be brought up to pressure.

The pressurised air passes into a series of combustion chambers, ending with a nozzle, in each of which an injector supplies fuel which mixes with the air to form an air-fuel mixture for burning.

Then, the combusted gases are sent to the turbine which transforms the heat content of the gases which have been combusted in the above-mentioned combustion chamber into mechanical energy available to a user.

Twin-shaft gas turbines have a gas generator and a power turbine with independent shafts which rotate at different speeds.

The power rotor consists of a shaft which, at one end, supports the low pressure turbine discs and at the other end, the load flange.

The hot gases generated in the gas generator must be converted into power available to a user by a low pressure turbine.

The low pressure nozzles accelerate and direct the hot gases towards the rotor blades, transmitting the useful power to the turbine's shaft.

Figure 1:
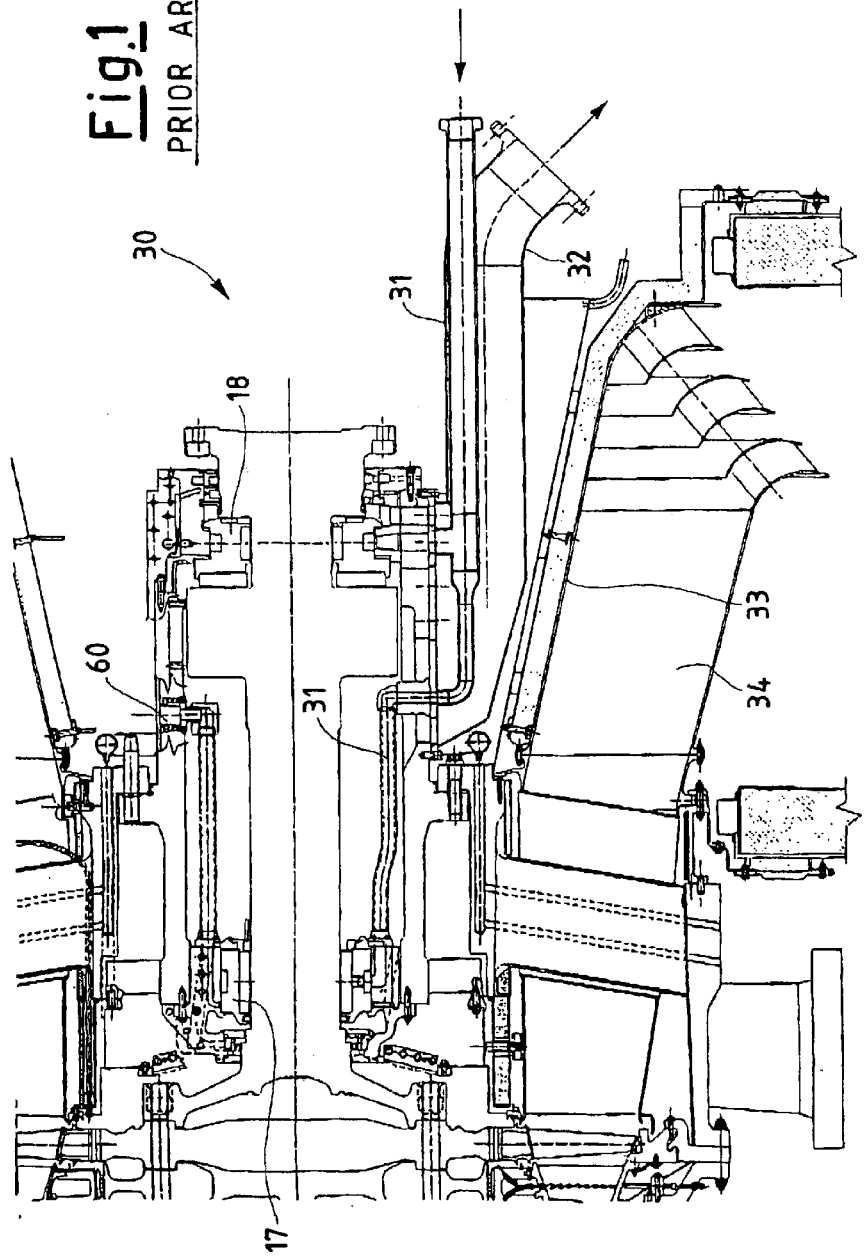

In order better to understand the technical problems which are involved in the present invention, at this point reference is made to the following state of the art, with particular reference to FIG. 1.

FIG. 1 represents a draining and cooling system for gas turbine cushions, relating to a twin-shaft turbine of the known art, indicated globally by the numeric reference 30.

In this case, the power rotor rests on a pair of cushions, indicated respectively by the numbers 17 and 18.

The heels of the cushions 17 and 18 are fitted onto a rigid support (cushions unit) which is supported by the cushion carrier unit.

It should be noted that in some cases the cushion unit is integral with the cushion carrier unit.

The service pipes 31 and 32 of cushions 17 and 18, through which pass the lubricating oil and the air for pressurisation of the seals on the shaft, are installed in the area adjacent to the load flange.

Each cushion 17 and 18 has at least one oil feed pipe 31, a pipe 60 for the seals barrier air and a drain pipe 32 common to both the lubricating oil and the sealing air containing the oil vapours.

In fact, the oil and barrier air feed and drain area is a "difficult environment" as it is located inside the drain diffuser 34, the walls of which 33, usually insulated, have areas of very high temperature as a result of the thermal bridges which are created and for which there is no practical means of elimination.

In the event of an oil leak, the insulation may become impregnated with a consequent emission of fumes or flames.

Furthermore, the turbines designed most recently have undergone a transformation as a result of which the connections area is even less accessible and even smaller.

Therefore, lubricating oil and pressurisation air must be supplied, avoiding oil leaks (or leaks of air containing oil vapours in the case of the drain pipes) through the static seals (joints between stator parts).

It is also necessary to try to limit as much as possible the size of the cushions 17 and 18, of the seals and of the units which support the cushions 17 and 18 themselves in particular in the case of small, low-power gas turbines.

Another key aspect to be considered in the draining of oil is the maximum temperature that the oil may reach.

In fact, the lubricating oil must not reach excessively high temperatures, otherwise it deteriorates and loses its own physical capacities and properties.

The turbine's internal unit, that is the unit which supports the cushions, is made from materials which cannot withstand high temperatures (for example cast iron) in order to limit costs, but it supports the drain diffuser 34 in which flow the gases at high temperature.

Consequently, the internal part of the turbine's drain unit is covered with a layer of insulation and there is always a cooling system for the unit itself to keep the temperature low.

In general terms, it can, however, be observed that in power turbines the cushion housings are installed in the following ways:

In a first example, separate cushion housings are provided, where each has two end seals as the shaft passes through, and there are pipes which carry the lubricating oil which are usually contained within the drain pipes and pressurisation air pipes.

The two cushion housings are installed in the turbine drain unit with the appropriate provisions to take into account the differential expansions between the cushion housings and the drain unit, maintaining, however, the coaxiality of the shaft with the gas channel.

In a second example, the cushions are installed directly in a common unit, that is the shaft support unit, secured in its turn to the drain unit.

The service pipes are flanged in the area of cushion 18 which is usually a combined supporting and thrust cushion, the oil and pressurisation air feed connection is via pipes inside the unit, and the oil return from cushion 17 is by means of flowing to the bottom of the shaft support unit where it combines with that which drains from cushion 18.

The connection with the drain pipe which carries the oil into the central unit housing is in the area of cushion 18.

A third example of the known art provides three cushions, two support and one thrust, installed directly on the turbine drain unit. In this case the unit is structured to have the capacity to collect the oil drained from the cushions.

The turbine drain unit can be considered to be a combination of the shaft support unit and the drain unit itself, the service fluid connections are located in the area of cushion 18.

Consequently, the purpose of this invention is to create a draining and cooling system for gas turbine cushions which permits a more efficient circulation of the lubricating and cooling oil, to make the design of the pipes more rational, considering the increasingly limited spaces available on the most recently designed turbines.

Another purpose of the invention is that of creating a draining and cooling system for gas turbine cushions which serves to create a suitable cooling effect, that is such as to reduce the internal surface temperature of the turbine's drain unit and able to avoid a significant and damaging increase in the temperature of the oil itself.

Another purpose of the invention is that of creating a draining and cooling system for gas turbine cushions which offers a high level of efficiency and mechanical reliability, as well as being advantageous on an economic level.

These and other purposes fulfilled by a draining and cooling system for gas turbine cushions, where the above-mentioned gas turbine has a drain it, which consists of two essentially concentric rings connecting to each other by several spokes, where, inside the above-mentioned drain unit, there is a rotor shaft, associated with the cushions, characterised by the fact that the lubricating and cooling oil is fed to the above-mentioned gas turbine drain unit by means of at least a first pipe, located inside one of the above-mentioned spokes, and is drained by means of at least a second pipe, located inside another of the above-mentioned spokes.

In a particular version of this invention, a section of one of the above-mentioned drain pipes is passed inside the gas turbine drain unit.

In accordance with another preferred version of this invention, the lubricating and cooling oil is drained by means of at least a pair of pipes, each of which is located inside one of the spokes, where the above-mentioned pipes are suitably insulated as they pass through an area the temperature of which may be high.

More particularly, the oil feed pipe arrives inside the turbine drain unit and divides into two further pipes which feed the third and fourth cushions of the above-mentioned turbine.

In accordance with another preferred version of this invention, the cushion's thrust bearing drags the oil at high peripheral speeds and increases its energy level to create an accelerating jet for draining of the oil through at least one of the above-mentioned pipes located inside the spokes.

Further characteristics of the invention are defined in the claims attached to this patent application.

Figure 2:
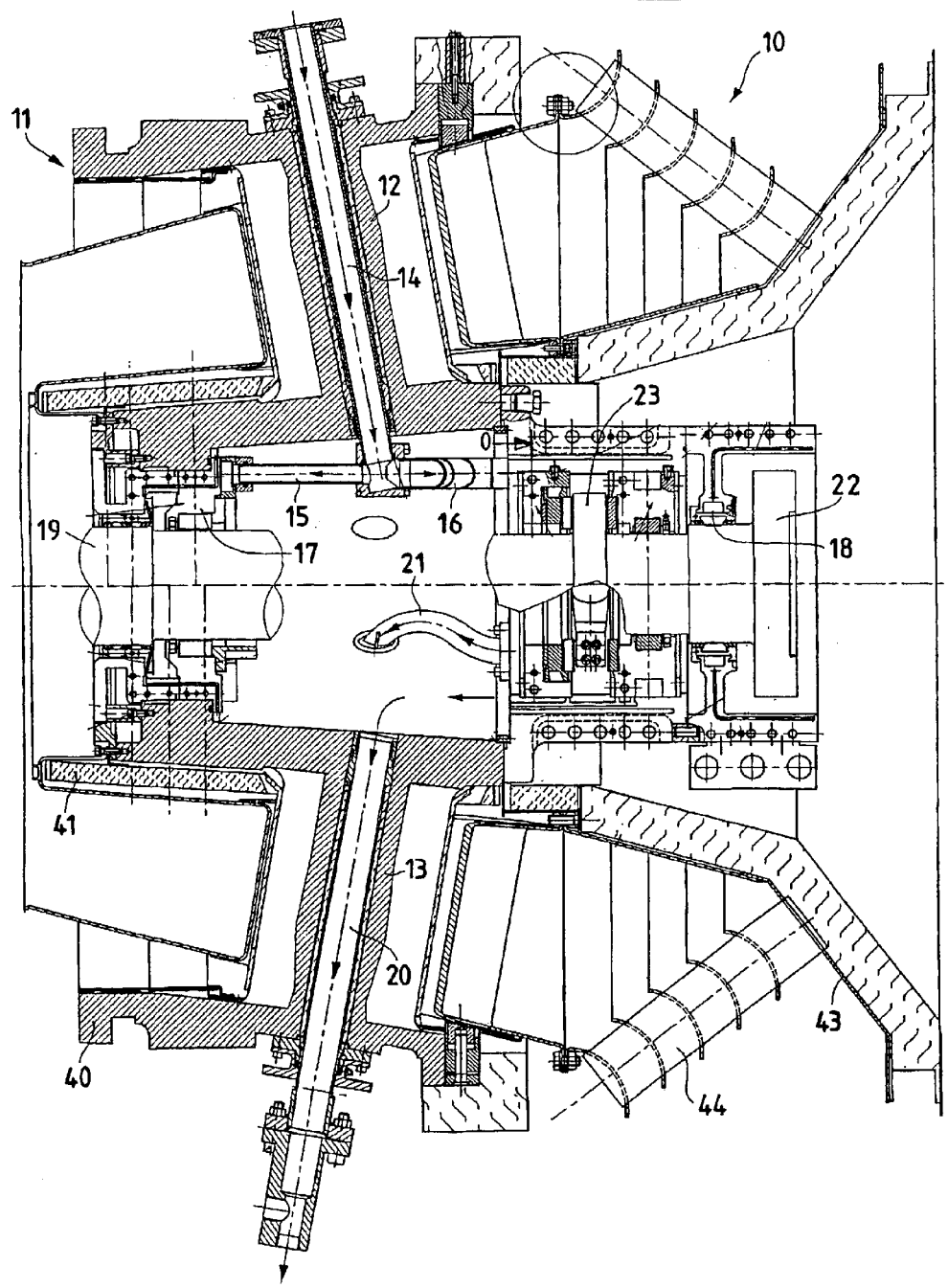

The further purposes and advantages of this invention, as well its structural and functional characteristics, will become clear on examination of the description which follows and of the drawings attached which are supplied simply as an explanatory and unlimited example and in which:

FIG. 1 represents, in section, a detail of a twin-shaft turbine in which a draining and cooling system for the turbine cushions can be seen, belonging to state of the art, and FIG. 2 represents, in section, a detail of a twin-shaft turbine in which the draining and cooling system for the turbine cushions can be seen, in accordance with this invention.

With particular reference now to FIG. 2, the draining and cooling system for the cushions of a twin-shaft gas turbine, in accordance with this invention, is indicated globally by the numeric reference 10.

In FIG. 2 it is possible to see the gas turbine drain unit 11 which consists of two rings 40 and 41, essentially concentric, connected by six spokes of which spokes 12 and 13 are can be seen in FIG. 2.

Inside the drain unit 11 is the rotor shaft 19 which is, among other things, associated with cushions 17 and 18.

To summarise, this invention solves the problems of the known art by means of an innovative system for draining the oil through the six spokes which connect the internal part 41 of the gas turbine drain unit 11 to its external part 40.

In other words, the choice is made to install the connections passing through the drain diffuser 44 which has appropriately insulated walls 43.

The oil is fed through a pipe 14 which passes through the spoke 12 of the turbine drain unit 11.

FIG. 2 also shows, indicated by arrows, the route of the oil from the feed into the drain unit 11 to draining.

The oil pipes 20 and 14 are appropriately insulated as they pass through an area with a temperature in excess of 250° C. and the oil would deteriorate if it reached such a temperature.

The oil feed pipe, that is pipe 14, arrives inside the turbine drain unit 11 and here divides into two further pipes 15 and 16 (which are not insulated) which feed the third and fourth cushion, indicated respectively by the numbers 17 and 18.

The sealing air of cushion 17 passes through suitable longitudinal holes (not represented on the figure attached for simplicity).

The sealing air arrives at the cushion 18 by the conventional means of feeding the drain diffuser area 44.

Neither cushion 17 nor 18 have barrier seals on the side which faces the inside of the turbine drain unit For this reason, the oil which has been sent to cushions 17 and 18 (even in excessive quantities in relation to their requirements) and which exits from the gap present between the cushion unit 11 and the rotor shaft 19, is centrifuged and sprayed onto the internal unit wall.

It is important to observe that the internal temperature of the turbine drain unit 11 would certainly be very high, an estimated 150° C. or above, without the cooling effect of the oil (a value which depends on the thickness of the layer of insulation) and as a result of this washing carried out using the oil from the cushions (temperature approximately 80° C.) it is cooled considerably.

The quantity of oil sprayed into the drain unit 11 is such that there is no noticeable increase in the temperature of the oil itself.

The oil then accumulates in the bottom internal section of the turbine drain unit 11 and is then conveyed to the outside of the machine by means of two pipes placed in the spokes, of which is visible in FIG. 2 the pipe 20 of spoke 13.

FIG. 2 also shows the drain pipe 21 of which part is located inside the drain unit 11 and part inside one of the spokes.

For reasons of space, the diameter of the above-mentioned pipes 20 and 21 is limited, but it is necessary for all the oil collected in the turbine drain unit 11 to be discharged for the following three fundamental reasons.

Firstly, if the oil were to remain in the turbine drain unit 11 for a long period it would deteriorate as a result of excessive heating.

Secondly, if the level of oil were to reach the rotor, this would result in a significant increase in dissipated energy and there could be dynamic problems.

Finally, if the oil reaches the level of the cushion seals, it flows through the seals themselves into the main channel through which pass the hot gases which have completed their expansion in the turbine or into the area of the drain flange 22 and therefore onto the drain diffuser.

In both cases the flow of the oil causes machine fires.

The problem has been solved by making use of the energy which the thrust bearing 23 of cushion 18 is able to provide for the oil itself.

In effect, the thrust bearing 23 drags the oil at high peripheral speeds (120 m/s) and increases its energy level (in other words the kinetic energy).

This kinetic energy is used by the pipe 21 in FIG. 2 to create an accelerating jet (that is an ejector jet) for draining of the oil.

A preferential solution of this invention, in particular from an economic point of view, specifies the use of a single pipe 20 for a single drain pipe inside a spoke 13, as its presence is, in fact, sufficient to drain the oil present in the turbine drain unit 11.

During the start up, shut down and lubrication cooling phases, the potential energy of the oil (or its level) is sufficient to guarantee a head able to overcome the losses of load along the two drain pipes 20 and 21 to avoid the above-mentioned problems.

Obviously, during these phases the level of oil is higher than under normal operating conditions, that is when the machine's shaft 19 is rotating.

From the description given, the characteristics of the draining and cooling system for gas turbine cushions, which is the subject of this invention, are clear, as are the advantages.

The following concluding comments and observations are made, in order to define the said advantages more accurately and clearly.

As, by means of the implementation of this system, the lubricating oil is fed and drained through the spokes, a more efficient circulation of the oil is obtained, as well as a more rational use of the reduced space available inside the turbine's draining area.

Furthermore, it succeeds in making use of the kinetic energy provided by the thrust bearing 23 to apply pressure to the oil.

It is clear that the draining and cooling system for gas turbine cushions, which is the subject of this invention, can be varied in numerous ways without deviating from the innovative principles inherent in the inventive concept illustrated.

Finally, it is clear that, in the practical implementation of the invention, any materials, shapes and dimensions of the details illustrated can be used according to requirements and can be replaced by other elements equivalent from a technical point of view.

The scope of the invention is defined by the attached claims.

What is claimed is:

1. A draining and cooling system for a gas turbine comprising:

a drain unit having two concentric rings which constitute, respectively, an external part and an internal part thereof, a plurality of spokes connecting said internal part and said external part, said drain unit including a rotor shaft and bearings for said rotor shaft, at least one first pipe for supplying lubricating and cooling oil to said bearings, said one first pipe being located inside a first spoke of the drain unit, said oil being sprayed into the drain unit, at least one second pipe located, at least partially, inside a second spoke of the drain unit for draining the oil sprayed into the drain unit, said first pipe being divided into two further third pipes inside said drain unit for feeding the lubricating and cooling oil to the bearings, said further third pipes not being insulated.

2. A draining and cooling system according to claim 1 wherein said second pipe is partially located in said drain unit.

3. A draining and cooling system according to claim 1 wherein said first and second pipes are insulated.

4. A draining and cooling system for a gas turbine comprising:

a drain unit having two concentric rings which constitute, respectively, an external part and an internal part thereof, a plurality of spokes connecting said internal part and said external part, said drain unit including a rotor shaft and bearings for said rotor shaft, at least one first pipe for supplying lubricating and cooling oil to said bearings, said one first pipe being located inside a first spoke of the drain unit, said oil being sprayed into the drain unit, at least one second pipe located, at least partially, inside a second spoke of the drain unit for draining the oil sprayed into the drain unit, a thrust bearing of one of said bearings being provided for dragging the lubricating oil at high peripheral velocities and for increasing an energy level of the lubricating oil to create an accelerating jet to drain the oil through said second pipe.

5. A draining and cooling system according to claim 4 wherein said second pipe is partially located in said drain unit.

6. A draining and cooling system according to claim 1 wherein said first and second pipes are insulated.

* * * * *